April 30, 1940. J. NEUFELD 2,198,971

METHOD OF MEASURING VISIBILITY

Filed Sept. 19, 1938

INVENTOR
Jacob Neufeld

Patented Apr. 30, 1940

2,198,971

UNITED STATES PATENT OFFICE 2,198,971

METHOD OF MEASURING VISIBILITY

Jacob Neufeld, Tulsa, Okla.

Application September 19, 1938, Serial No. 230,741

6 Claims. (Cl. 88—23)

My invention relates to the field of meteorology and in particular to a method for determining conditions of light and atmosphere as regards visibility or distinguishing objects by sight.

The visibility of an object is the ease with which it can be seen and it depends among other things upon the ability of the eye to differentiate between various light stimuli derived from the object. The subject matter of my invention relates to the study of physical conditions of a medium in which various objects are located and of the effect of these conditions upon the visibility of objects. In the study of the above conditions two factors should be taken into consideration: the illumination of the medium and the atmosphere in the medium, the atmosphere being considered here from the standpoint of its optical properties. The above two factors determine conditions which shall be referred to hereafter as "the visibility of a given medium".

The recent development of aviation gave considerable impetus to meteorology and the exactness and reliability of weather reports becomes more and more important to insure safety and comfort in navigation. Numerous attempts have been made to provide a method and apparatus for determining quantitatively the visibility not only at main terminal airports but at many intermediate landing fields and reporting stations along the route. It appears, however, that heretofore no method or apparatus has been proposed which would be adapted to perform visibility measurements continuously and automatically.

The most common method heretofore used for determining the visibility of a given location consists in selecting an extended series of well defined objects or marks suitably placed at determined distances with respect to an observer. Then the visual range is determined by specifying the distance in miles at which the marks cease to be visible. It is apparent that such a method requires an instrumental equipment which involves a considerable outlay and are very imprecise since they depend largely upon the ability of individual observers to perform visual estimations.

My invention obviates the above inconveniences of the prior art and provides hereby a new and novel method simple and reliable in operation for performing visibility measurements of a given medium precisely, continuously and automatically.

My invention in its essential aspects, involves the use of a standard object to be viewed from a determined distance by an electric eye comprising photocells. The visibility of a given medium is determined by the ability of the electric eye to distinguish the object by differentiating various light rays reflected therefrom when the apparatus is placed in the given medium.

In accordance with my invention, I am providing a visibility meter comprising a test object exposed to light of a given medium and reflecting light in a variable amount, a lens imaging the object upon a photoelectric system and a means for making comparative measurements of the light intensities associated with various portions of the image. The measurements of light intensities are done by creating electrical currents the intensities of which correspond to the light intensities, and their comparative values determine the relative values of the currents as an index of visibility of the medium in which the standard object is located.

The features and objects of my invention will be apparent from the following description in connection with the accompanying drawing, in which.

Figure 1:
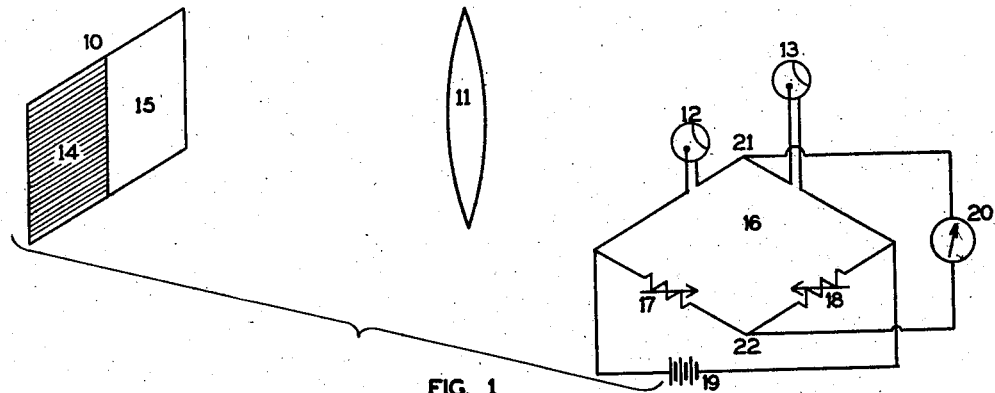
Fig. 1 shows a visibility meter according to my invention which comprises two photocells and an electric meter responsive to the differential output of the photocells.

Referring now to Fig. 1 there is shown schematically a visibility meter which comprises a standard object 10 which is projected by means of a lens 11 upon photoelectric cells 12 and 13. The object is located at a fixed distance from the lens and from the photoelectric cells and should possess distinguishable light characteristics. Thus the object 10 has been made in form of two adjacent rectangular surfaces 14 and 15 of different colors, the surface 14 being black and the surface 15 white. The object 10 is projected by means of the lens 11 onto photoelectric cells in such a manner that the image of the surface 14 falls upon the cell 12 and the image of the surface 15 falls upon the cell 13. The photoelectric cells are included in two arms of a bridge circuit 16, the other two arms of which include resistors 17 and 18 that, preferably, are adjustable for balancing. The bridge circuit is energized from a suitable source 19. An electrical zero meter 20 is connected across the points 21, 22 in the bridge circuit.

It will be readily appreciated that when the visibility of the medium is poor, the eye is not capable of perceiving satisfactorily the difference in color between the surfaces of 14 and 15 since the ability to see an object resides essentially in perceiving various light contrasts associated with the object. Therefore, under poor visibility conditions the amount of light falling upon the photocell 12 is substantially equal to the amount of light falling upon the photocell 13 and for the proper balancing of the bridge the resistors 17 and 18 are substantially equal one to another. Thus when the ratio of the resistors 17 and 18 approaches the value one for the proper balancing of the bridge, the visibility of the medium is poor. If, however, the visibility of the medium is good the eye is capable of perceiving satisfactorily various light contrasts associated with the object and consequently the amount of light derived from the rectangle 15 and falling upon the photocell 13 is considerably larger than the amount of light derived from the rectangle 14 and falling upon the photocell 12. Then for the proper balancing of the bridge it is necessary to adjust the resistors 18 and 17 until the meter 20 indicates zero current. Then the ratio of the resistors 18 and 17 is considerably larger than one.

It is now apparent that the ratio of the resistors 18 and 17 provides an index of the visibility of a given medium. For the value one of the ratio the visibility is very bad and for increasing values of the said ratio the visibility becomes better.

In order to illustrate better conditions affecting the visibility of a medium assume that the lens 11 and the photocells 12 and 13 have been substituted by a human eye. It is apparent that the ability of the human eye to distinguish between the surfaces 14 and 15 depends upon the light intensities which are associated with the images of these surfaces projected upon the eye. In that connection two factors should be considered. The first of these factors depends upon the light conditions, i. e. the illumination of the medium in which the apparatus of Fig. 1 is located and the second factor is influenced by the atmosphere in the given medium, the atmosphere being considered from the standpoint of its optical properties. As stated above these two factors characterize the visibility of a medium and determine the manner in which the photoelectric cells 12 and 13 respond to the presence of the standard object 10.

In order to illustrate the influence of the first of the above factors upon the visibility assume that there is no source of light in the medium, i. e., there is no illumination falling upon the surfaces 14 and 15. It is apparent that under such conditions there will be no light reflected from either of the surfaces 14, 15 upon the respective photoelectric cells and consequently no differential response of the photoelectric cells. The visibility will be then zero and this agrees with our experience since in the absence of illumination the objects are not visible.

In order to illustrate the influence of the second of the above two factors, i. e., of the atmospheric conditions, assume that there is an abundance of external light such as for instance during daytime. Assume however, that the atmospheric conditions are such that haze and fog prevails. It will be apparent that then the light which might have been reflected from the surfaces 14, 15 is dispersed by the atmosphere and there are no distinct images transmitted to the photocells. Thus both photocells receive approximately the same amount of light and there is no differential response which could be detected by the bridge. Consequently there is zero visibility. This agrees with our experience since in time of fog and haze the objects may not be visible.

The above two cases represent extreme conditions at which visibility of the medium is zero. In general cases, however, the photocells 12 and 13 receive unequal amounts of light and then the variable resistors 17, 18 are properly changed so as to bring the reading of the meter 20 to zero. The relative values of the resistors 17, 18 indicate then the differential response of the photocells 12, 13 and provide therefore a measurement of the ability of the photoelectric system to differentiate between the surfaces 14 and 15. It is, therefore, apparent that I have provided a method for determining the visibility of the medium in which the apparatus of Fig. 1 is located.

Figure 2:
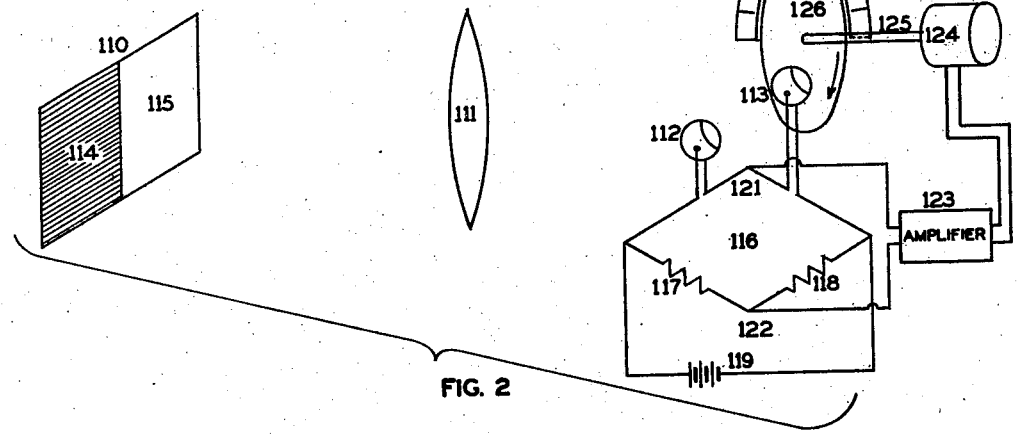
Fig. 2 shows a modified embodiment of my invention in which the said differential output controls the amount of light falling upon one of the photocells.

Fig. 2 shows another embodiment of my invention. The visibility meter represented schematically in this figure comprises in a similar manner as in Fig. 1 a standard object 110 which contains black and white surfaces 114, 115. The object 110 is projected by means of lens 111 upon photoelectric cells 112 and 113 in such a manner that the image of the surface 114 falls upon the cell 112 and the image of the surface 115 falls upon the cell 113. The photocells are arranged in opposition in a bridge circuit 116. The bridge circuit has two fixed resistors 117, 118 and is energized by a battery 119. The fixed resistors have been so selected that when equal illumination is incident upon the photocells 112 and 113 no current is delivered across the output terminals 121, 122. However, when the illumination of the photocell 113 is greater than that of the photocell 112 an unbalance in the bridge occurs and a voltage is delivered across the terminals 121, 122. This voltage is amplified in a D. C. amplifier 123 and then transmitted to a motor 124. The motor is adapted to be energized by the voltage derived from the amplifier 123 and causes the rotation of a shaft 125 in the direction indicated by the arrow. A light filter 126 is mounted on the shaft 125 between the photocell 113 and the lens 111 and intercepts the light transmitted from the lens to the photocell. The filter is of circular shape, has been made of ground glass and is adapted to be rotated with the shaft. The filter has precise circular gradients in turbidity, i. e., its turbidity is constant along any radius, but varies circumferentially so that by rotating the shaft 125 a continuous variation of turbidity is obtained and the amount of light allowed to pass through the filter to the photocell 113 is continuously varied. The filter is provided with a pointer 127 which indicates on a fixed graduated scale 128 the exact angular position of the filter. By rotating the filter in the direction indicated by an arrow the amount of light coming from the surface 115 and falling upon the photocell 113 is made to decrease gradually. Under the usual visibility conditions the amount of light derived from the white surface 115 and directed upon the photocell 113 is larger than the amount of light derived from the dark surface 114 and falling upon the photocell 112. The difference between these two amounts is a measure of visibility. Consequently by rotating the filter in the direction of the arrow the conditions of illumination of the photocell 113 approach those of the photocell 112, and the amount of unbalance between the photocells gradually decreases. Then the torque applied to the motor 124 and caused by the unbalance current between the terminals 121 and 122 gradually decreases until conditions of equilibrium are reached at which the rotary movement of the filter 126 stops and the apparent brightness of the image of the surface 115 projected upon the photocell 113 is substantially equal to the apparent brightness of the image of the surface 114 projected upon the photocell 112. The angular position of the filter is indicated by means of the pointer 127 on the calibrated stationary frame 128. It is therefore apparent that the numerical index shown by the pointer represents the difference between the light stimuli corresponding to images 114 and 115 which fall upon the photocells 112 and 113 respectively. Consequently this index may be used to represent the visibility condition of the medium in which the apparatus shown in Fig. 2 is located.

It is apparent that the effectiveness of the control of the motor 124 by the unbalance of the photocells 112 and 113 depends upon the circuit constants, the amplification factor of 123, the characteristics of the motor, etc. and approaches as a limit the ideal condition. Its action is such that it only reduces the amount of unbalance but does not reduce it to zero. It is also apparent that the degree of effectiveness of this arrangement can be increased at will and to approach as nearly as desired the ideal limit at which the light falling upon the photocell 113 becomes equal to the light falling upon the photocell 112.

Figure 3:
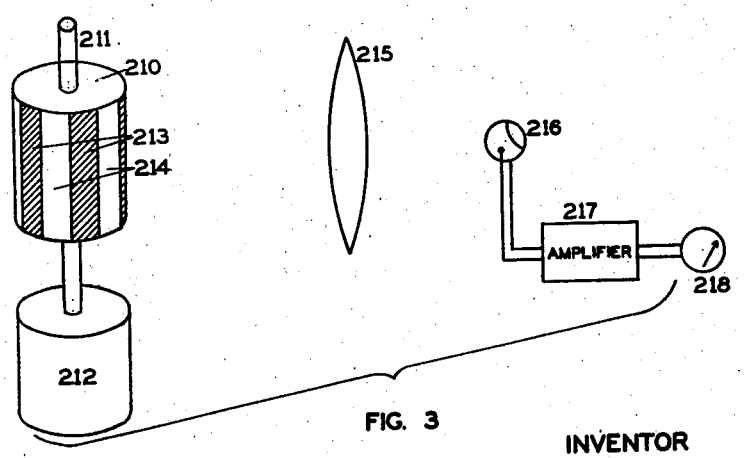
Fig. 3 shows a third embodiment of my invention which comprises a single photocell which is subjected alternately to two light impulses of different intensity.

Fig. 3 represents schematically the third embodiment of my invention. The visibility meter shown in this figure comprises a cylinder 210 mounted on a shaft 211 and adapted to be driven by a motor 212. The outer surface of the cylinder possesses longitudinal stripes which alternate in color, such as black stripes designated by 213 and white stripes designated by 214. The cylinder is imaged by means of the lens 215 upon a photoelectric cell 216. The arrangement is such that if at a given instant the cell is exposed to the image of a black stripe 213 an instant later, after the cylinder has rotated a determined angle, the same cell 216 will be exposed to the image of a white stripe 214 and afterwards to a black stripe 213 and so on. Consequently during the rotation of the cylinder the cell 216 is exposed to light beams reflected alternately from the surfaces 213 and 214 at a frequency which depends upon the frequency of alternation of the light effects, i. e. upon the speed of rotation of the cylinder 210. It is now apparent that if the speed of rotation of the cylinder is maintained constant, the photoelectric cell will deliver at its output varying current, the variation of which will have a constant frequency but an amplitude depending upon the difference of the light intensities reflected by the stripes 213 and 214 and falling upon the photocell 216.

It is therefore obvious from what it has been said in the preceding paragraphs that the difference between the intensities of light rays reflected from the surfaces 213 and 214 and transmitted through a determined portion of the medium represents the visibility conditions in the said medium. Accordingly I am providing in the output of the photocell 216 an A. C. amplifier 217 and an A. C. meter 218. The amplitude of the A. C. current delivered by the photocell expresses the difference in light intensities reflected from 213 and 214 and gives a measure of the visibility of the medium in which the apparatus is located.

In view of my invention and disclosure variations and modifications to meet individual whim or particular need will doubtless become evident to others skilled in the art to obtain all or part of the benefits of my invention without copying the structure shown, and I, therefore claim all such in so far as they fall within the reasonable spirit and scope of the claims.

I claim:
1. In a method of determining varying visibility of a medium by means of a reference object, having definite and known light characteristics, the said object being exposed to light in the said medium and having various portions responding differently and in a known manner to the said light, the steps of passing light from the said portions through the said medium to a receiving zone, receiving light from the said portions in said zone after said light has been modified in passing through said medium, translating said light into electrical currents, the said currents corresponding to the light received respectively from the different portions, and deriving from the said currents an indication of the visibility of the medium.

2. In a method of determining visibility of a medium by means of a standard reference object, the said object being exposed to light in the said medium and having various portions responding differently and in a known and predetermined manner to the said light, the steps of passing the light from the said portions through the said medium to a receiving zone, receiving the light from the said portions in said zone after said light has been modified in passing through the said medium and translating said light into electrical signals, the said signals corresponding to the light received respectively from the said various portions, comparing magnitudes of the said signals and producing an electrical current representing the relative magnitudes of the said signals.

3. The method of determining visibility of a medium which comprises producing a reference visual field in the said medium the said visual field comprising parts of different and known light characteristics, passing light from the said field through the said medium to a receiving zone, receiving said light in said zone after said light has been modified in passing through said medium, and translating said received light into electrical currents, said currents having characteristics corresponding to the light characteristics of the parts of the said field and deriving from the said currents the visibility index of the said medium.

4. The method of determining visibility of a medium which comprises producing a reference visual field in the said medium, the said visual field comprising various portions of different and known light characteristics, passing light from the said field through the said medium to a receiving zone, producing an image of the said portions in said zone by means of said light received from the said field and modified in passing through the said medium, the said image of the said portions having light characteristics depending upon the visibility of the medium, translating the light characteristics of the said image into electrical currents, the said currents having magnitudes corresponding to the light characteristics of the various portions of the image, comparing the magnitudes of said currents, and providing a visibility index depending upon the relative magnitudes of the said currents.

5. In a method of determining visibility of a medium by means of a reference field, the said field being exposed to the light in the said medium and having various portions responding differently and in a known manner to the said light, the steps of passing light from the said field through the said medium to a receiving zone, receiving said light from the said portions in the said zone after said light has been modified by passing through the said medium, translating said light into electrical currents, the said currents having magnitudes corresponding to the light received respectively from the different portions of the said field, and producing an indication of the relative magnitudes of the said currents as an index of the visibility of the medium.

6. In a method of determining visibility of a medium by means of a reference field, the said field having portions of different and known light characteristics, the steps of passing light from the said field through the said medium to a receiving zone, receiving said light from the said portions in the said zone after said light has been modified by passing through said medium, translating said light into electrical currents, the said currents having magnitudes corresponding to the light received respectively from the different portions of the said field, and deriving from the said currents an indication of the relative values of the said magnitudes as a measure of the visibility of the medium.

JACOB NEUFELD.